United States Patent [19]
Lee

[11] Patent Number: 6,005,937
[45] Date of Patent: Dec. 21, 1999

[54] UNIVERSAL DECODER

[75] Inventor: Hyun Gon Lee, Kyung Ki-Do, Rep. of Korea

[73] Assignee: International Video Network, Inc., Calabasas, Calif.

[21] Appl. No.: 08/962,179

[22] Filed: Oct. 31, 1997

Related U.S. Application Data

[63] Continuation of application No. 08/400,048, Mar. 7, 1995.

[30] Foreign Application Priority Data

Mar. 7, 1994 [KR] Rep. of Korea .......................... 94-4285
Mar. 12, 1994 [KR] Rep. of Korea .......................... 94-5037
Apr. 1, 1994 [KR] Rep. of Korea .......................... 94-6935
Sep. 6, 1994 [KR] Rep. of Korea ........................ 94-22971
Oct. 4, 1994 [KR] Rep. of Korea ........................ 94-25358

[51] Int. Cl.[6] .............................. H04N 7/167; H04N 7/01
[52] U.S. Cl. ................................ 380/10; 380/20; 348/13; 348/555; 455/3.2; 455/5.1
[58] Field of Search .......................... 380/10, 20; 348/12, 348/13, 554, 555, 558, 726, 735; 455/3.2, 4.1, 5.1

[56] References Cited

U.S. PATENT DOCUMENTS

| | | | |
|---|---|---|---|
| 4,623,920 | 11/1986 | Dufresne et al. | 380/20 |
| 4,641,363 | 2/1987 | Hasegawa | 455/4.1 |
| 4,928,272 | 5/1990 | Ohue | 370/50 |
| 5,058,160 | 10/1991 | Banker et al. | 380/20 |
| 5,303,295 | 4/1994 | West et al. | 380/10 |
| 5,355,162 | 10/1994 | Yazolino et al. | 348/11 |
| 5,359,601 | 10/1994 | Wasilewski et al. | 380/19 X |
| 5,363,142 | 11/1994 | Yoshida | 348/554 |
| 5,388,101 | 2/1995 | Dinkins | 370/95.1 |
| 5,412,416 | 5/1995 | Nemirofsky | 348/10 |
| 5,440,632 | 8/1995 | Bacon et al. | 380/20 |

Primary Examiner—Pinchus M. Laufer
Attorney, Agent, or Firm—Wagner, Middlebrook & Kimbell, LLP

[57] ABSTRACT

A universal decoder consisting of modules that may be exchanged with a module of a like type which provides automatic frequency changes and remote system control of the decoder by a host computer. The decoder minimizes signal invasion by providing a data signal frequency change device between a broadcast station and subscriber terminals. Converters modules are classified into fixed function and variable function modules. The fixed function module is a singularly-bodied unit assembled onto a PCB while the variable functions are modularized based on their functions. The connecting circuitry and the data communication protocol between fixed functions and the variable functions is standardized thereby improving the lifetime of the converter. Hacking is solved by allowing the scramble system to be changed. Compatibility problems are eliminated since the modules are made in accordance with internationally uniform or standardized specifications. An improved data communication method between station and the subscriber converter/decoder is provided by using a cable/non-cable combination method and multi-channel, variable frequency method. A polling method of communication method allows pay per view, viewer survey, home shopping, etc. and other two way communication roles and functions.

30 Claims, 4 Drawing Sheets

UNIVERSAL DECODER

This is a Continuation of application Ser. No. 08/400,048, filed Mar. 7, 1995.

BACKGROUND OF THE INVENTION

1. Field of the Invention

This invention relates in general to a universal television decoder, and more particularly, to a universal decoder consisting of modules which provide automatic frequency changes and system control of the transmitter and receiver of the decoder by the host computer.

2. Description of Related Art

CATV and satellite systems have been in use for quite some time. However, until now, the television decoders have not been standardized or interchangeably designed.

All the major manufacturers of decoders produce and sell decoders designed specifically for use with their own scramble system. These decoders are equipped with descramblers that can only function in a specific environment. Thus, with different firms producing different coders with different standards, the question of compatibility arises and the need to establish an international standard for decoders becomes evident.

In addition, the development and progress of computers and electronics technologies has brought about more sophisticated scramble systems. Nevertheless, this has given rise to security problems as a result of providing those with ulterior motives more and better tools. Up to now, if there is signal invasion and/or interference from outside to the data communication line between the cable station's host computer and a subscriber set-top unit during normal two-way cable TV operations, the data communication becomes paralyzed because data cannot be transmitted or received.

Specifically, if there are continuous reciprocal interferences and cable station cannot find the signal invasion point, then cable station must collect the set-top unit from every subscriber and physically change the existing data communication frequency from the unit to an uninterfered new frequency. Thus, in the event of security breaches, CATV operators are forced to change not only the scramble system, but all the decoder boxes as well. This creates many problems for the operation of two-way cable TV data communications. Furthermore, this adds on tremendous extra replacement costs that the CATV operator cannot avoid.

Another problem exists with communication between the CATV operator and each subscriber's decoder. Two-way data communication technology is one of the core technologies needed to operate a two-way cable TV system between the CATV operator and the subscriber's decoder. But each decoder manufacturer produces products built specifically for use within their own data communication system. Thus, the question of compatibility arises again. Existing converters do not provide a solution to the signal interference or signal ingress problem during two-way communication between the station and the subscriber converter. Furthermore, due to the technical circumstances, broadcast stations have always used telephone lines for upstream communication. However, because of the telephone modem's disadvantages, it was never possible for perfect two-way communication.

In addition, since existing converter communication methods between the station and the subscriber relied on cable, the converter's communication frequencies were set. Moreover, since each station used different frequencies, there was no compatibility among the converters. In addition, the repair cost is high and the lifetime of the converter is short because the existing converters are made as a single-bodied unit rather than combined modules.

Furthermore, current converter/decoders do not provide international compatibility. For example, video standards differ from country to country, region to region, as does the bilingual and stereo system, the electrical voltage, current cycle, and the frequency apportionment for CATV. It is no wonder that in this situation there isn't a decoder that is compatible with all these various standards around the world. Further, there is no compatibility among parts.

Still further, as new scramble systems are developed around the world, each decoder manufacturer stubbornly clings to their own scramble systems. This strategy does not allow cable operators much choice. Thus, cable operators are forced to choose from one of the few scramble systems decoder manufacturers offer.

For cable TV broadcasting network operation, the traditional two-way data communication system involves a station's host computer calling a subscriber set-top unit using a successive call method. For the subscriber set-top unit to report the data to the host computer, the successive call method took about 30 minutes per 100,000 subscribers. Therefore, the successive call method prohibits performing an instant viewer rating survey for 15 second, 20 second or 30 second short commercials.

Finally, the features that the various decoder manufacturers provide are similar: on-screen display, timer, favorite channel programming, self-diagnostics to name a few. But again there is no compatibility in software menu.

Therefore, it can be seen that there is a need for the development of an internationally compatible universal decoder.

It can be seen that there is a need to improve the lifetime of the converters to semi-permanent to reduce the operation cost of a broadcasting station.

It can therefore be seen that there is a need to improve the traditional two-way data communication system of the cable TV operation so that viewer rating for the short video materials can be precisely surveyed.

It can seen then that there is a need for a universal decoder that has enhanced security features.

It can also be seen that there is a need for a universal decoder which allows remote modifications of frequencies.

It can also be seen that there is a need for a universal decoder which provides greater scramble selection flexibility.

SUMMARY OF THE INVENTION

To overcome the limitations in the prior art described above, and to overcome other limitations that will become apparent upon reading and understanding the present specification, the present invention discloses a universal decoder for cable or satellite television signals consisting of modules. The universal decoder also provides automatic frequency changes and system control of the transmitter and receiver of a decoder by the host computer.

To change the data communication frequency of the subscriber set-top unit, a host computer may change the data communication modem frequency without removing the set-top unit from the subscriber home. Thus, convenience and efficiency to the two-way communication is provided. Furthermore, the invention minimizes any hindrance of the communication between cable station and subscriber caused by outside signal invasion by providing a transmitting & receiving data signal frequency change device between the cable station and subscriber set-top terminals (converter, decoder).

Converters according to the invention are classified into two groups: "fixed function" and "variable function". The fixed function is a singularly-bodied unit assembled onto a printed circuit boards (PCBs) while the variable functions are modularized based on their functions. The connecting circuitry and the data communication protocol between fixed functions and the variable functions is also standardized. Hacking is solved by allowing the scramble system to be changed. By making some functions modular, the lifetime of the converter can be improved. Yet compatibility problems are eliminated by manufacturing the modules in accordance with internationally uniform or standardized specifications.

The data communication method between station and the subscriber converter/decoder is improved by using cable and non-cable combination method and multi-channel (variable frequency) method. The two-way communication problem is solved from the basic method while the multi-channel (variable frequency) method allows compatibility among different countries and stations. By improving the communication method and allowing it to operate indirectly rather than directly, pay per view, viewer survey, home shopping, etc. and other two way communication roles and functions are allowed via polling methods.

One aspect of the present invention is that converters made with the universal standards are compatible, hence, the broadcasting station can cut their upgrade cost sharply.

Another aspect of the present invention is that station can accommodate a large selection of video and audio scrambling systems during operation.

Another aspect of the present invention is that because descramblers have different address and security codes from the converter, the security and converter cannot be used for piracy in the case of loss.

Another aspect of the present invention is that if the revenue loss occurs for the station due to the unauthorized descrambler, the station can change the scrambling system at the minimum cost by replacing the descrambler module rather than whole converter.

Another aspect of the present invention is that broken modules or units can be replaced at the site, thus, reducing the repair cost by 50% and the converter's life time can be improved.

Another aspect of the present invention is that the power supply unit or other modules can be changed to make the decoder internationally compatible if the country or region has different video standards, bilingual and stereo audio system, the voltage, or current cycle system.

Another aspect of the present invention is that the communication modem is improved by implementing a variable frequency function and the cable and air communication technology is combined to fundamentally solve any two-way communication problem.

Still another aspect of the present invention is that the two-way communication possibilities are infinitely increased by implementing an indirect communication method.

Yet another aspect of the present invention is that standardization allows mass production of modules thereby lowering decoder/converter price.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a universal decoder for cable and satellite television signals. The universal decoder includes modules and provides automatic frequency changes and system control of the transmitter and receiver of a decoder by the host computer.

Each nation has different video standards, various bilingual and stereo audio systems, different apportionment of upstream and downstream frequency, and different power voltage and current cycle systems. Therefore, to ensure universal compatibility, the universal decoder's features are divided into two categories: fixed functions and variable functions. Universal compatibility is ensured by producing variable features in modules or units.

Figure 1:
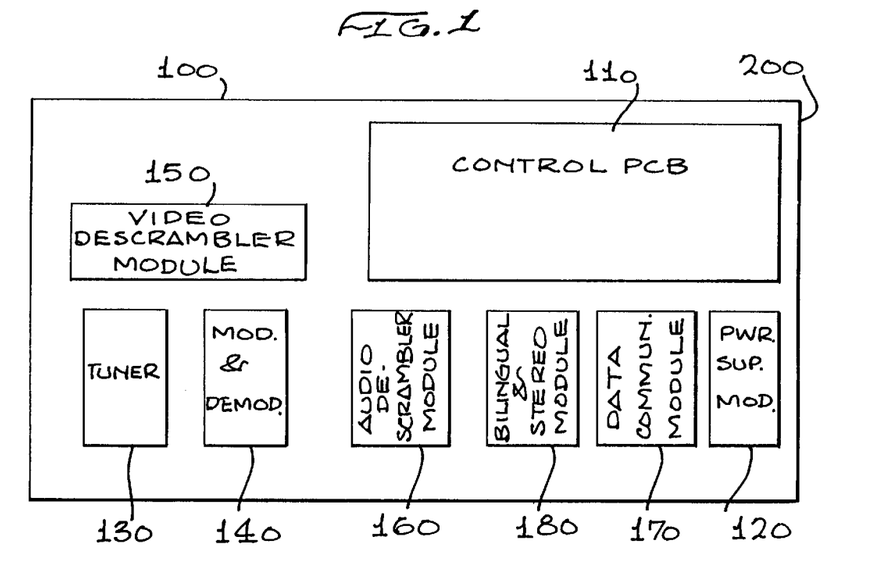
FIG. 1 illustrates an exemplary modular, universal decoder system according to the present invention.

FIG. 1 illustrates a universal decoder 100 according to the present invention. The universal decoder 100 is divided into nine units and each unit is standardized separately. The nine units are the control PCB 110, the power supply unit 120, the tuner module 130, the modulator and the demodulator module 140, the video descrambler 150, the audio descrambler module 160, the data communication module 170, the bilingual & stereo module 180, and an external remote controller (not shown). A single box 200 houses the control PCB 110, the power supply unit 120, the tuner module 130, the modulator and the demodulator module 140, the video descrambler 150, the audio descrambler module 160, the data communication module 170, and the bilingual & stereo module 180.

Various features which are commonly used by decoders are selected as the basic features. For example, some of the features that the various decoder manufacturers provide are on-screen display, timer, favorite channel programming, and self-diagnostics. The system control IC and software are produced to operate the various features selected. The control PCB 110 is designed and produced accordingly to control all nine units selected above. The power supply unit 120 is made into an independent unit and attached separately. By being independent from the main unit 200, it can be changed and replaced at will depending upon each country's voltage and current cycle.

The tuner 130 is made in a "module" form that conforms to the various video standards of different countries. It is also designed to be replaceable. Furthermore, system changes are made possible through the use of the system controller 110.

The modulator and demodulator module 140 is also standardized so that it conforms to system operations. Bilingual and stereo features are separated and added on to the bilingual and stereo module 180 separately. This is to ensure that the bilingual & stereo features become modular.

The video descramble module 150 is built according to the technological standards of existing descramblers thereby ensuring compatibility. However, a separate address code and security code is assigned for each descrambler 150. These codes are different and independent of the address and security codes assigned to the Control PCB 110. This ensures that other systems in the decoder are not adversely affected by a change in one module. With this extra set of codes, the security of the decoder is enhanced compared to conventional decoders.

The audio descramble module 160 is also built according to existing technological standards thereby ensuring compatibility. A track configuration between the audio descrambler 150 and the video descrambler 160 is laid to ensure the use of the address and security codes assigned to the video descramble module 150. The descramble modules rearrange the video and audio elements of a cable telecast signal into an intelligible format thereby providing access to a cable or satellite telecast signal.

As mentioned above, since each nation has a different frequency apportionment scheme, a change in frequency should be possible. Taking the above matters into consideration, the universal decoder includes a data communication module 170 which uses a phase-locked loop (PLL) variable frequency system for the transmission system. Thus, the central computer has the ability to change the transmission frequency. of the decoder in each subscriber's home. To facilitate two-way communication a separate band for each communication link is provided by an in-band and an out-band channel. Frequency shift keying techniques are used to facilitate the two-way data communication. However, those skilled in the art will recognize that other techniques could be used (e.g., ASK, PSK, AM modulation, FM modulation, and PM modulation). A secondary (reserve) system can be installed using the in-band system. This system is to be used to restore the out-band communication when it is out of line. When this module 170 is attached, an interface with the "subscriber managing software" is achieved thereby allowing for the IPPV feature thorough RF. When a telephone module is attached instead, the IPPV feature is still functional through the use of the telephone.

Again modules are to be built to conform to each country's standards since each country has its own standard. Thus the bilingual and stereo module 180 is designed to give cable operators the choice to attach the module 180 or to do without it. An external remote controller (not shown) is built to interface with Control PCB 110. The features and system of the controller will include most of the features available in other controllers in the market.

Figure 2:
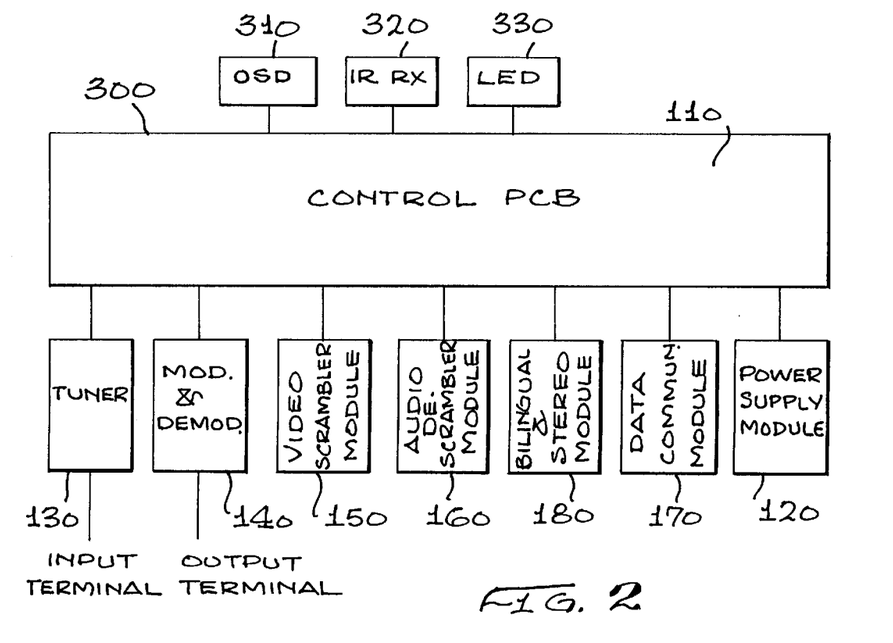
FIG. 2 illustrates a block diagram of an exemplary modular, universal decoder system with remote control capability according to the present invention.

FIG. 2 illustrates a block diagram of an exemplary modular, universal decoder system 300 with remote control capability according to the present invention. In FIG. 2, the modules 120–180 are connected to the control PCB. In addition, to provide remote capabilities, an on screen display module (OSD) 310, infrared receiver (IR RX) 320, and LED indicators 330 are also coupled to the control PCB.

Referring again to FIG. 1, a decoder 100 according to the present invention changes the data transmitting & receiving modem's frequency of the subscriber set-top unit 100 to transmit & receive the data signal between the cable station and the subscriber set-top unit 100. However, those skilled in the art will recognize that the universal decoder is not limited to cable television systems, but may also be used with satellite signals. During the transmitting & receiving of the data signal between cable station and subscriber set-top unit 100, if signal interference or invasion of the outside signal causes hindrance to the data communication, the transmitting & receiving frequency of the set-top unit 100 may be changed to a new frequency.

In prior systems, if there is signal invasion or/and interference from outside to the data communication line between cable station's host computer and subscriber set-top unit 100 during normal two-way cable TV operations, the data communication becomes paralyzed because data cannot be transmitted or received.

More specifically, if there is continuous reciprocal interference and the cable station cannot find the signal invasion point, then the cable station must collect all the set-top unit 100 from every subscriber and physically change the existing data communication frequency from the unit 100 to the uninterfered new frequency.

However, the decoder 100 according to the invention solves these problems. If the data communication frequency of the subscriber set-top unit 100 needs to be changed, the cable station's host computer can easily change the data communication modem frequency without removing the set-top unit 100 from the subscriber home.

Figure 3:
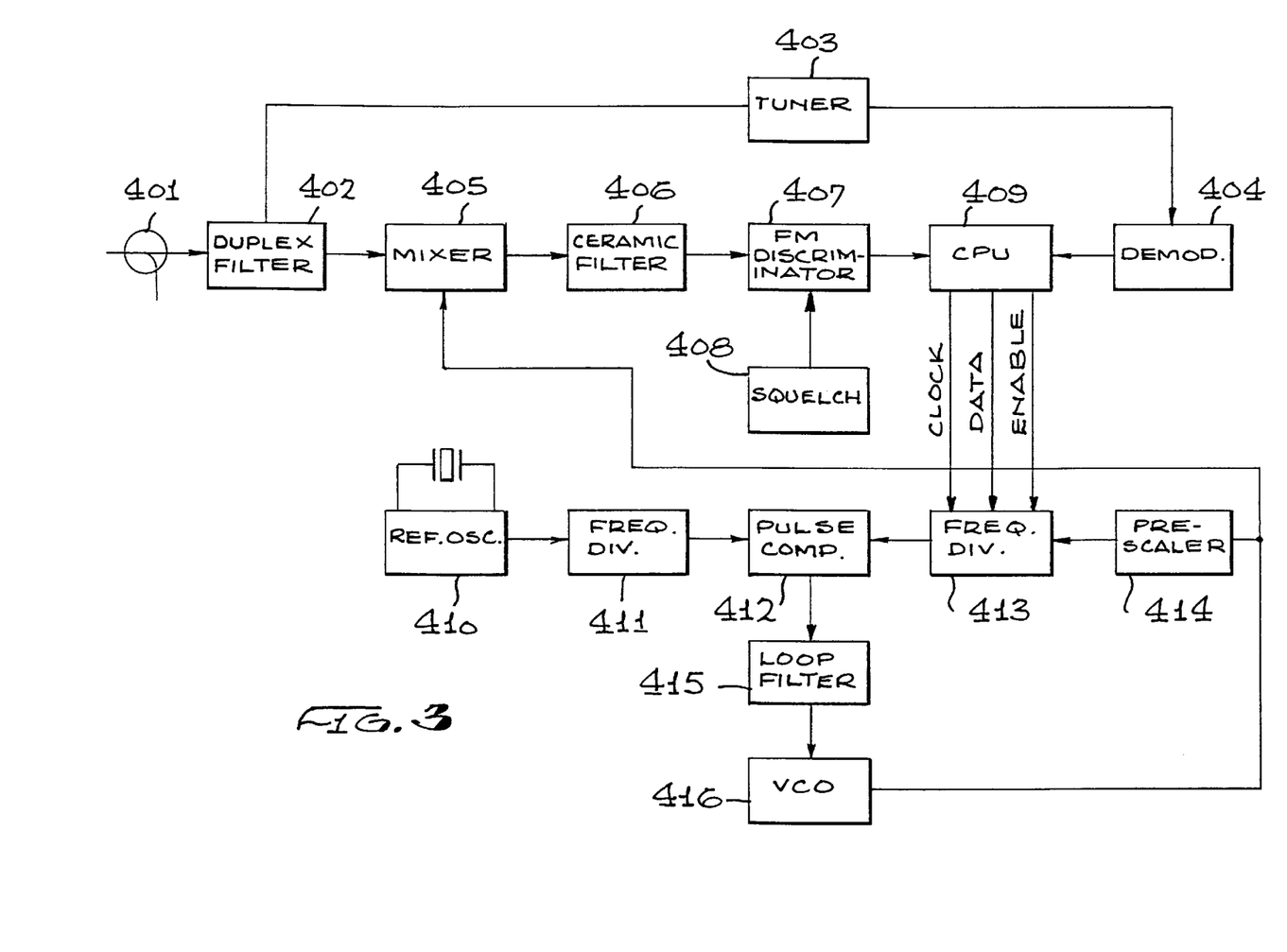
FIG. 3 is a block diagram of the data signal frequency change device receiver.

Consistent with this concept, FIG. 3 illustrates a block diagram of the data signal frequency change device receiver. As FIG. 3 shows, from the cable station through the coaxial cable line, the RF input signal is received by input terminal 401 to the duplex filter 402. The input signal may be composed of a telecast signal and an information signal from a cable broadcast host computer superimposed thereon. The design of the receiver includes a duplex filter 402 which separates the RF signal when it is inputted from the input terminal 401. Duplex filter 2 separates the input signal and supply the in-band video signal to the tuner 403 and the RF signal to the mixer 405. The tuner 403 selects the channel to the video band signal separated from the duplex filter 402. A demodulator 404 demodulates the video signal of the selected channel from the tuner 403 and then provides channel change data to the CPU 409. Mixer 405 mixes the RF signal separated from the duplex filter 402 with an oscillating frequency signal from the voltage control oscillator 416 to change to the intermediate frequency signal. Ceramic filter 406 filters the intermediate frequency signal outputted from the mixer 405. FM discriminator 407 discriminates the filtered signal from the ceramic filter 406 to obtain a digital signal and squelch circuit 408, associated with FM discriminator 407, eliminates the squelch noise of the FM discriminator.

CPU 409 then translates the input data and carry out the corresponding receiver function control of the applicable command.

On one hand, to change the receiving frequency the CPU 409, according to the frequency change information data received from the station, changes the frequency dividing ratio of the N frequency divider 413 of the PLL circuit to change the oscillating frequency of the voltage control oscillator 16 which in turn changes the receiver frequency.

However, if the receiving frequency cannot be received because the line is invaded by other frequencies, the pre-selected analog format will not be able to transmit the data from the station to the CPU 409. Therefore, the station host computer transmits the channel change data by in-band video signal of the regular broadcasting channel.

Therefore, the receiver frequency change data of the in-band video signal supplied from the station gets separated from the duplex filter 402 to the tuner 403 and the applicable channel signal selected from the tuner gets demodulated by the demodulator 404 and supplied to CPU 409.

At this time, CPU 409 translates the input frequency change data information. In addition, CPU 409 according to the frequency's frequency dividing ratio gives clock, data and enable signal to the N frequency divider 413 to change the frequency dividing ratio of the N frequency divider.

The changed frequency dividing ratio goes through phase comparator 412 and loop filter 415, and changes the local oscillating frequency of the voltage control oscillator 416. Therefore, the local oscillating frequency supplied to the mixer 405 is different, and in correspondence, the new receiving frequency changes the frequency of the receiver. That is, the reference frequency generated from the reference oscillator 410 goes through the R frequency divider 411 and divides the signal by 1/R and supplies it to the phase comparator 412. Then the phase comparator 412 compares the phase of the reference signal from the R frequency divider 411 with the phase of the signal from the N frequency divider 413 and supplies to loop filter 415. The oscillating frequency of the voltage control oscillator 416 changes accordingly to the filtered voltage from the loop filter 415 and changed oscillating frequency of the voltage control oscillator's 416 output is supplied to mixer 405.

The output signal of the voltage control oscillator 416 goes through the pre-scaler 414 and gets fed back to the N frequency divider 413 to form the PLL loop.

As described in detail above, when there is an outside wave invasion to the communication line, the receiving frequency of the converter can be changed. Also, transmitting frequency of the transmittable data signal from the converter to the cable station can be changed.

Figure 4:
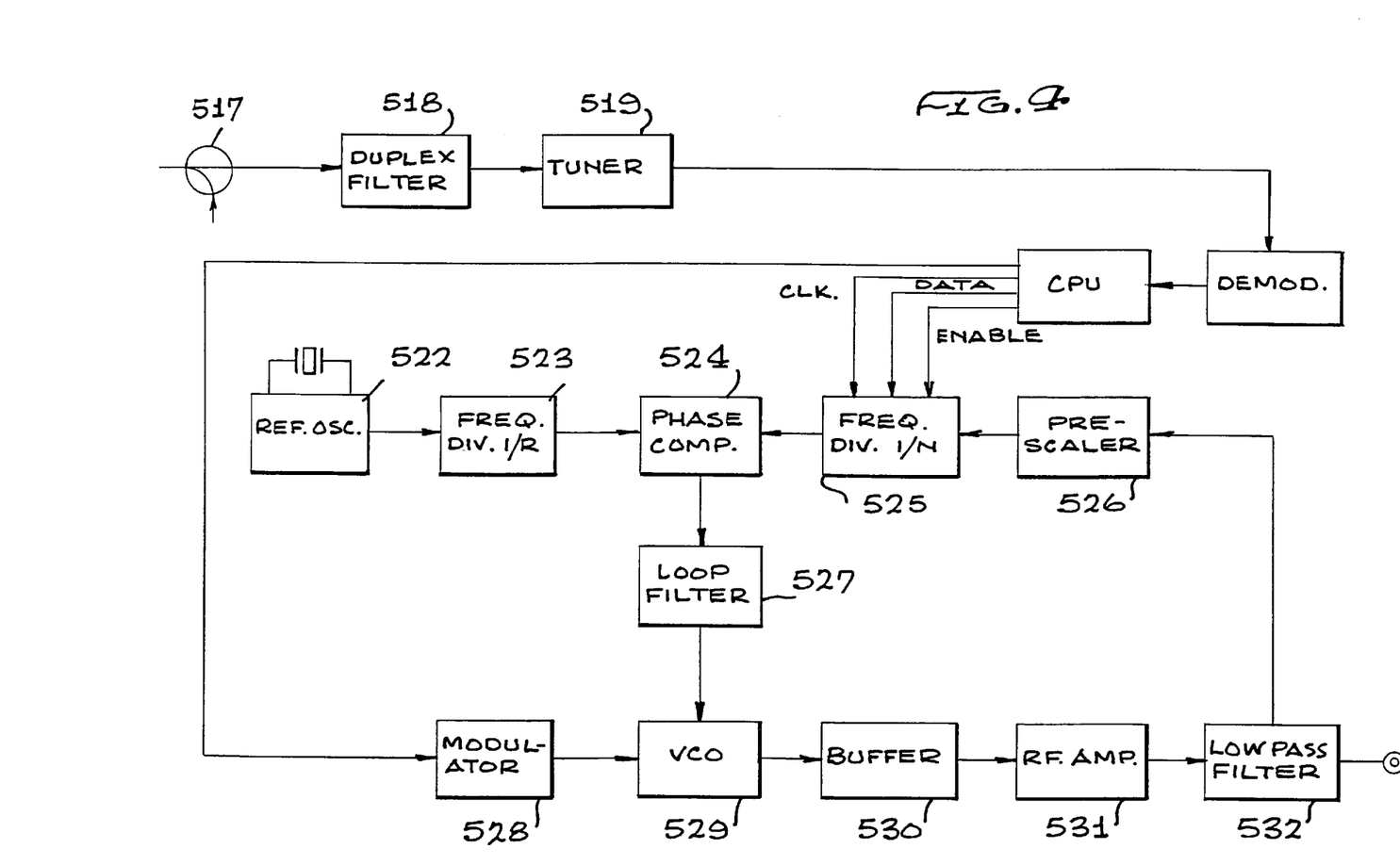
FIG. 4 is a block diagram of the data signal frequency change device's transmitter.

FIG. 4 represents the transmitter circuit organization of the transmitting & receiving data signal frequency change device between cable station and subscriber set-top terminal (converter, decoder). As FIG. 4 shows, the transmitted information data from the cable station goes through the input terminal 517 to the duplex filter 518 where the in-band video signal of the regular broadcasting channel gets separated. A tuner 519 selects the channel of the output signal from the duplex filter 518 and a demodulator 520 demodulates the output signal from the tuner 519 and supplies the transmitting frequency change data to the CPU 521.

CPU 521 translates the frequency change data of the demodulator 520 and controls the frequency division ratio to correspond to the applicable frequency. CPU 521 also translates the input data and output the handled information data to the modulator 528. Modulator 528 modules the input data and through voltage control oscillator 529, buffer 530, RF amplifier 531 and low-pass filter 532. The output of the low-pass filter is also transmitted to pre-scaler 526.

On one hand, to change the transmitting frequency the CPU 521 according to the RF signal instruction transmitted from the station through the cable line, changes the frequency dividing ratio of the N frequency divider 525 to change the transmitting frequency.

However, if the line is invaded by other frequencies, the transmitting frequency cannot be received. Therefore, the station host computer transmits the channel change data by in-band video signal of the regular broadcasting channel.

Therefore, the transmitting frequency change data of the in-band video signal supplied from the station gets separated from the duplex filter 518 to the tuner 519 and gets demodulated by the demodulator 520 and supplied to CPU 521.

Consequently, the CPU 521 according to the transmitted frequency change data, supplies clock, data and enable signal to the N frequency divider 525 to changes the frequency dividing ratio.

That is, the reference frequency generated from the reference oscillator 522 goes through the R frequency divider 523 and divides the signal by 1/R and supplies to phase comparator 524. Phase comparator 524 compares the phase of the reference signal from the R frequency divider 523 with the phase of the signal from the N frequency divider 525 and supplies it to loop filter 527. The oscillating frequency of the voltage control oscillator 529 changes accordingly to the filtered voltage from the loop filter 527.

Therefore, the data signal handled by CPU 521 and modulated by modulator 528 (i.e., the signal that contains the transmittable information from the subscriber set-top box to the cable station) is carried by changed frequency of the voltage control oscillator 529 of the oscillated signal to the buffer 530 to be buffer amplified and to the RF amplifier 531 to be power amplified low-pass filter 532 eliminates unnecessary frequency signal element from the output signal of the RF amplifier 531 and transmit and supply to pre-scaler 526.

That is, the frequency of the transmittable output signal from the low-pass filter 532 is controlled by CPU 521 to be changed.

As explained in above, the design is during the transmitting & receiving of the data signal between cable station and subscriber set-top unit, if signal interference or invasion of the outside signal causes hindrance to the data communication, by using in-band video signal of regular broadcasting channel, cable station can change out-band frequency to transmit & receive the data. Therefore, this design can overcome communication hindrance between cable station and subscriber set-top unit to provide the solution to the most serious problem of the two way cable operation which is transmitting & receiving frequency hindrance problem.

Figure 5:
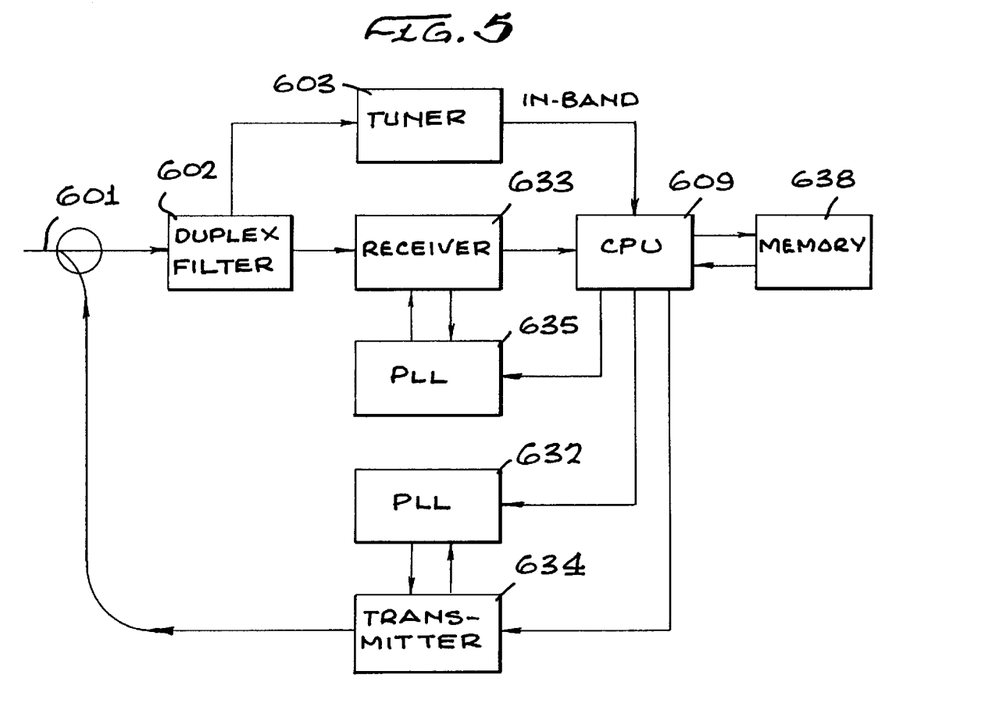
FIG. 5 is a block diagram of the viewer rating survey and two-way data communication system using separate PLL circuitry.

FIG. 5 illustrates is a block diagram of the viewer rating survey and two-way data communication system using separate PLL circuitry. For cable TV two-way communication, regardless of two-way or one-way communication between cable station and subscriber set-top unit, if signal ingress causes hindrance to the cable line communication or cross-wires, cable stations can send the transmitting and receiving frequency change instruction signal data on in-band of the transmitting video signal using either wire or wireless transmission from the cable TV station to the cable TV subscribers set-top unit.

In FIG. 5, after the input signal is filtered by duplex filter 602, the in-band data reaches the CPU 609 through set-top unit tuner 603. The CPU 609, according to the received transmitting and receiving frequency change instruction data, using the transmitting PLL 636 and receiving PLL 635, changes the receiver's 633 data receiving frequency or/and transmitter's 634 transmitting frequency to an undisturbed frequency so that cable TV station and subscriber set-top unit can always communicate data without signal interference.

Figure 6:
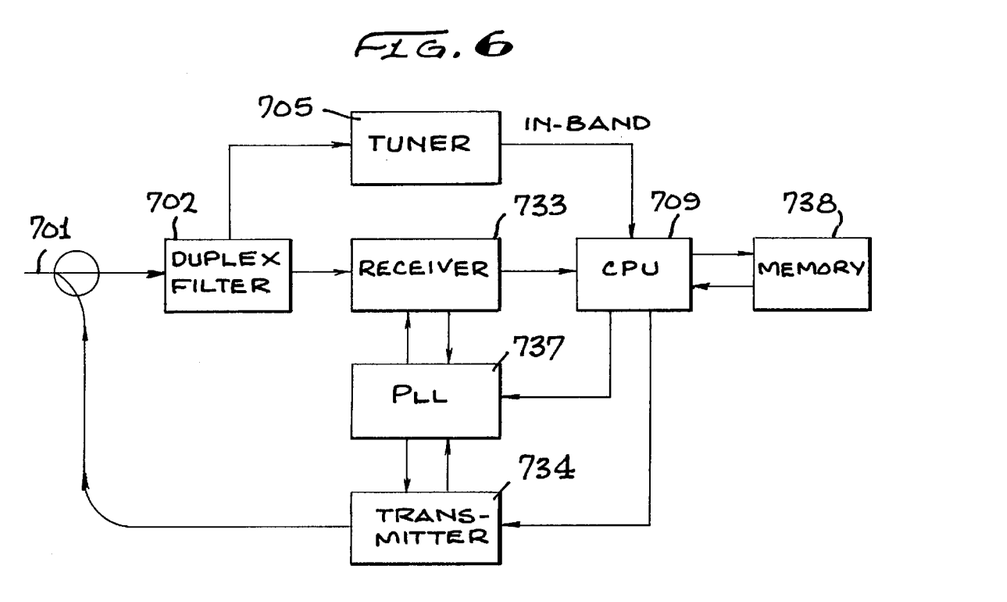
FIG. 6 is a block diagram of the viewer rating survey and two-way data communication system using one PLL circuit.

Furthermore, as FIG. 6 illustrates, if converter's transmitter 734 and receiver 733 are connected by combination transmitting and receiving PLL circuit 737 the circuit organization is simplified. At this time, if the cable TV host computer instructs the unit to report the subscriber's viewing channel details at appointed time, the subscriber set-top unit's CPU 709, according to the simultaneous instruction given to every subscriber, the converter's viewing channel gets stored at storage element 738. When the station's host computer calls every subscriber's set-top unit by a successive calling method, each converter reports the stored data of the storage element 738 and the stored data automatically gets deleted.

When this method is used, if each subscriber has some information to notify to the TV station's host computer, the information can be stored in subscriber converter's storage element 738 and when the station's host computer calls successively it can be notified so that two-way data communication between TV station and subscriber's set-top unit can be achieved.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A modular television decoder system having a two-way data signal transceiver, comprising:
    input means for receiving an input signal from a broadcast facility at a receive frequency, the input signal comprising a telecast signal superimposed on an information signal from a broadcast host computer;
    transmit means for transmitting a data signal to the broadcast facility at a transmit frequency;
    separating means, coupled to the input means, for separating the information signal from the broadcast host computer from the superimposed telecast signal from the broadcast facility, the information signal being a data signal or an instruction signal;
    descramble means, coupled to the separating means, for rearranging elements of a telecast signal into an intelligible format thereby providing access to a telecast signal;
    tuning means, coupled to the separating means, for tuning to the telecast and information signal transmitted by the broadcast facility;
    changing means, coupled to the input means, comprising means for changing the receive frequency of the input means or the transmit frequency of the transmit means in response to a change frequency instruction signal from the broadcast facility and comprising means for changing a transmitting frequency in response to a transmit frequency change instruction from the broadcast host computer.

2. The decoder system of claim 1 further comprising control means for controlling the functions of the descramble means, the tuning means, and the changing means.

3. The decoder system of claim 1 wherein the descramble means is modular thereby allowing repair of the descramble means or replacement of the descramble means.

4. The decoder system of claim 1 wherein the receiving and tuning means is modular thereby allowing repair of the tuning means or replacement of the receiving and tuning means.

5. The decoder system of claim 1 wherein the changing means is modular thereby allowing repair of the changing means or replacement of the changing means.

6. The decoder system of claim 1 further comprising security means, coupled to the descramble means, for providing security and access codes to the descramble means.

7. The decoder system of claim 6 further comprising means, coupled to the security means, for altering the security and access codes of the descramble means.

8. The decoder system of claim 1 wherein the descramble selection means further comprises an audio descramble means and a video descramble means.

9. The decoder system of claim 1 further comprising bilingual and stereo means for providing international compatibility.

10. The decoder system of claim 1 wherein the means for changing the transmitting frequency comprises a transmitter phase-locked loop means for adjusting and controlling the transmit frequency.

11. The decoder system of claim 1 further comprising memory means for storing decoder data and a central processing unit for controlling the descramble means, the receiving and tuning means, and the changing means.

12. The decoder system of claim 1 wherein the changing means further comprises means for changing a receiving frequency in response to a receiving frequency change instruction from the broadcast host computer.

13. The decoder system of claim 12 wherein the means for changing the receiving frequency comprises a receiver phase-locked loop means for adjusting and controlling the transmit frequency.

14. A universal decoder system, comprising:
    (a) control means for controlling functions of a decoder;
    (b) power supply means, coupled to the control means, for providing power to the decoder; and
    (c) a plurality of modules coupled to the control means, the plurality of modules comprising:
        (i) adjustable descramble selection means, coupled to the control means, for descrambling of a scrambled signal from a broadcast facility;
        (ii) adjustable two-way data communication means, coupled to the control means, for enabling signals to be passed between a broadcast facility and the decoder at a receive frequency and a transmit frequency and to change the receive and transmit frequency of the decoder, the adjustable two-way data communication means comprising a two-way data transmitting system means and receiving system means located between the broadcast facility and the universal decoder system, and means for changing the transmitting and receiving frequency in response to a frequency change instruction from the broadcast facility, the means for changing the transmitting and receiving frequency comprising a combination transmitter and receiver phase-locked loop circuit for adjusting and controlling the transmit frequency; and
        (iii) security means, coupled to the control means, for controlling the descrambling of signals and for controlling access to the decoder.

15. A modular television decoder system having a two-way data signal transceiver, comprising:

input means for receiving an input signal from a broadcast facility at a receive frequency, the input signal comprising a telecast signal superimposed on an information signal from a broadcast host computer;

transmit means for transmitting a data signal to the broadcast facility at a transmit frequency;

separating means, coupled to the input means, for separating the information signal from the broadcast host computer from the superimposed telecast signal from the broadcast facility, the information signal being a data signal or an instruction signal;

descramble means, coupled to the separating means, for rearranging elements of a telecast signal into an intelligible format thereby providing access to a telecast signal;

tuning means, coupled to the separating means, for tuning to the telecast and information signal transmitted by the broadcast facility;

changing means, coupled to the input means, comprising means for changing the receive frequency of the input means or the transmit frequency of the transmit means in response to a change frequency instruction signal from the broadcast facility and means for changing the transmitting frequency and receiving frequency in response to a frequency change instruction from the broadcast host computer, the means for changing the transmitting and receiving frequency comprising a combinations transmitter and receiver phase-lock loop means for adjusting and controlling the transmit frequency.

16. A modular cable access television decoder system for subscribers having universal access capability, comprising:

(a) a modular tuning means having an interchageable capability by changing of modules according to television tuning standards of each country so that it provides international compatability;

(b) a modular modulation and demodulation means having an interchangeable capability by changing of modules according to television modular modulation and demodulation standards of each country so that it provides international comparability;

(c) a modular descrambler means having an interchangeable capability by changing of modules according to television scramble system standards of each country so that it provides international compatability;

(d) a modular on-screen display means having an interchangeable capability by changing of modules according to the language of each country so that it provides international compatability;

(e) a modular bilingual and stereo means having an interchangeable capability by changing of modules according to bilingual and stereo standards of each country so that it provides international compatability;

(f) a modular multi-channel data communication modem means for receiving and transmitting data between a host computer of a cable broadcast facility and a subscribers' decoders, the modular multi-channel data communication modem means having frequency changing capability by an instruction data signal from the host computer of the broadcast facility and means for changing the transmitting frequency in response to a transmit frequency change instruction from the broadcast host computer;

(g) a modular power supply unit having an interchangeable capability by changing of modules according to power standards of each country so that it provides international compatability; and (h) a mother board means having a control function of the system and a connection capability of the modules according to television standards of each country and the system of each cable broadcast facility so that it provides international compatability.

17. A universal decoder system, comprising:

(a) control means for controlling functions of a decoder;

(b) power supply means, coupled to the control means, for providing power to the decoder; and (c) a plurality of modules coupled to the control means, the plurality of modules comprising:

(i) interchangeable descramble selection means, coupled to the control means, for descrambling of a scrambled signal from a broadcast facility; and (ii) interchangeable two-way data communication means, coupled to the control means, for enabling signals to be passed between a broadcast facility and the decoder at a receive frequency and a transmit frequency and to change the receive or transmit frequency of the decoder, the interchangeable two-way data communication means comprising a two-way data transmitting system means and receiving system means located between the broadcast facility and the universal decoder system, and means for changing the transmitting frequency in response to a transmit frequency change instruction from the broadcast facility.

18. The decoder system of claim 17 wherein the interchangeable descramble selection means further comprises an audio descramble selection means and a video descramble selection means.

19. The decoder system of claim 17 wherein the interchangeable two-way data communication means further comprises data receiver means and a data transmitter means.

20. The decoder system of claim 17 wherein the plurality of modules further comprises bilingual and stereo means for providing international compatibility for the decoder.

21. The decoder system of claim 17 wherein the power supply means is modular and conforms to one of a plurality of international voltage, current and frequency specifications.

22. The decoder system of claim 17 wherein the modular descramble selection means further comprises a unique access and security code.

23. The universal decoder system of claim 17 further comprising a tuner for tuning a telecast signal and information signal according to the television standard of each country.

24. The universal decoder system of claim 17 further comprising an on-screen display for displaying information in a predetermined language.

25. The decoder system of claim 17 wherein the means for changing the transmitting frequency comprises a transmitter phase-locked loop circuit for adjusting and controlling the transmit frequency.

26. A method for providing two-way communication between a television decoder system and a broadcast facility, comprising the steps of:

(a) transmitting from the broadcast facility a telecast signal superimposed on an information signal from a broadcast facility to a subscriber decoder system;

(b) receiving at a receive frequency the telecast signal superimposed on the information signal;

(c) separating the telecast signal and information signal into the information signal from the broadcast facility and the superimposed telecast signal from the broadcast facility, the information signal being a data signal or an instruction signal;

(d) rearranging the elements of the telecast signal into an intelligible format thereby providing access to a telecast signal;

(e) transmitting at a transmit frequency data from the decoder to the broadcast facility;

(f) tuning to the telecast and the information signal transmitted by the broadcast facility; and (g) changing the receive or transmit frequency in response to receiving a change frequency instruction signal from the broadcast facility; and (h) changing a transmitting frequency in response to a transmit frequency change instruction from the broadcast facility.

27. The method of claim 26 further comprising the step of providing security and access codes for allowing the rearranging of the elements of the telecast signal.

28. The method of claim 27 further comprising the step of altering the security and access codes.

29. The method of claim 26 wherein step (f) further comprising the step of changing a receiving frequency in response to a receive frequency change instruction from the broadcast facility.

30. The method of claim 26 further comprising the steps of processing signals for controlling the decoder and storing decoder data.

* * * * *